Jan. 27, 1953 L. R. BROWN 2,626,996

CONVERSION FROM DIRECT CURRENT TO DOUBLE VOICE FREQUENCY IMPULSING

Filed Feb. 4, 1948 3 Sheets-Sheet 1

Inventor
Leslie Ronald Brown
By R. P. Morris
Attorney

SENDING RELAY SET RELEASE SIGNAL

RECEIVING RELAY SET RELEASE SIGNAL

Inventor
Leslie Ronald Brown
By R. P. Morris
Attorney

CONVERSION FROM DIRECT CURRENT TO DOUBLE VOICE FREQUENCY IMPULSING

Filed Feb. 4, 1948 3 Sheets-Sheet 3

Inventor
Leslie Ronald Brown
By R. P. Morris
Attorney

Patented Jan. 27, 1953 2,626,996

UNITED STATES PATENT OFFICE 2,626,996

CONVERSION FROM DIRECT CURRENT TO DOUBLE VOICE FREQUENCY IMPULSING

Leslie Ronald Brown, London, England, assignor to International Standard Electric Corporation, New York, N. Y., a corporation of Delaware Application February 4, 1948, Serial No. 6,247
In Great Britain February 7, 1947

3 Claims. (Cl. 179—16)

This invention relates to electric signalling systems and more particularly though not exclusively, to long distance telephone systems.

With modern carrier systems, advantage is taken of the possibility of reducing the line amplifier capacity on the assumption that all the speech channels will not be speaking simultaneously in a single direction. The capacity of these amplifiers has been so reduced that there is a danger that voice frequency signals occurring on a number of channels simultaneously will cause overloading and as a result, cross-talk. These undesirable conditions can be improved in two ways, by reducing the sending levels of the signals and by reducing the duration of the signals. For a call set up by dialling a number of digits it is probable that the dialling process will occupy a considerable percentage of the total signal time for the call. Another factor which tends to increase total signal time is the need to prefix each train of impulses with a prefix signal which will prepare the distant end of the long distance circuit for the reception of the impulses.

According to the present invention therefore one feature of the invention is a signal translating means operable to accept trains of D. C. selective signals, such signals being in the form of "breaks" in the electrical continuity of the signal channel, and to transmit without previous storage, trains of voice frequency signals, all except the last of any such train being transmitted during the inter-break "make" periods, each representing the immediately preceding accepted break signal and with the last signal of any such train being transmitted immediately following the acceptance of the break signal which it represents and being of duration substantially equal to one of the said make periods.

A second feature of the invention is signal translating means operable to accept trains of D. C. selective signals, such signals being in the form of breaks in the electrical continuity of the signal channel, and to transmit without previous storage, trains of voice frequency signals, any one of such trains being representative of trains of D. C. selective signals and commencing to be transmitted immediately following the transmission of a voice frequency preparatory signal which takes place during the acceptance of the first break signal of the train of D. C. selective signals which is to be translated.

Impulses from a telephone dial consist of breaks in the line circuit, the breaks being on average 66 milliseconds with intervening makes of an average 33 milliseconds. With this usual break-make ratio, the signal duration of a train of signals transmitted by a translating means according to this invention is decreased, and in addition, the prefix is inserted without storage of impulses.

In order to create the last transmitted signal of a train, a timing device is used to check the duration of the "make" period. A relay and condenser combination or a slow-release relay is used to measure a period slightly greater than the normal "make" period. When this timing device operates, the last transmitted signal generated by the continuous make at the end of a transmitted train of signals is concluded, and at this time a signal of the prefix frequency may also be transmitted if desired which will indicate to the incoming end that the transmitted train is complete.

The same or another timing device is also used for a second function, namely to control the maximum timing of the prefix. With the 66:33 dial ratio the break-period is a mean of 66 ms., and the make-period, 33 ms. A suitable timing device set to operate after 50 ms. causes the prefix to be terminated at this point and the first translated signal to commence. This results in a short increase in the duration of this first signal which is desirable as it is the impulse which tends to suffer the greatest distortion due to line and other conditions.

The second timing function also has the effect that for the repetition of signals which may reach the V. F. sending circuit as 50 cycle or other similar signals, a single impulse is transferred into a 50 ms. prefix and suffix of length equal to 50 ms. plus the period that the signal exceeds the prefix length. In consequence, a short signal is modified into a prefix and short signal whilst a long signal is modified into a prefix and long signal. At the incoming end, the signals are converted back to 50 cycle currents the prefix signals not being repeated. It is also possible to repeat other signals in addition to short and long signals. One signal of two short impulses with a short inter pulse interval is repeated over the V. F. section of the line as prefix and two impulses.

As has already been noted the first "break" period of a dialled train of impulses is used to send the prefix signal which is of a particular frequency $x$, while during the "makes" of the dialled impulses, signals transmitted are of frequency $y$. At the receiving end, the latter signals are translated and lengthened to give the normal 66 ms. duration impulse to the selection equipments.

The present invention will be more readily understood from the following detailed description of one embodiment thereof which should be read in conjunction with the accompanying drawings in which—

Figs. 1 and 2 show in diagrammatic form the handling of 6 impulses forming one digit train while.

*Impulsing conditions*

Figure 1:
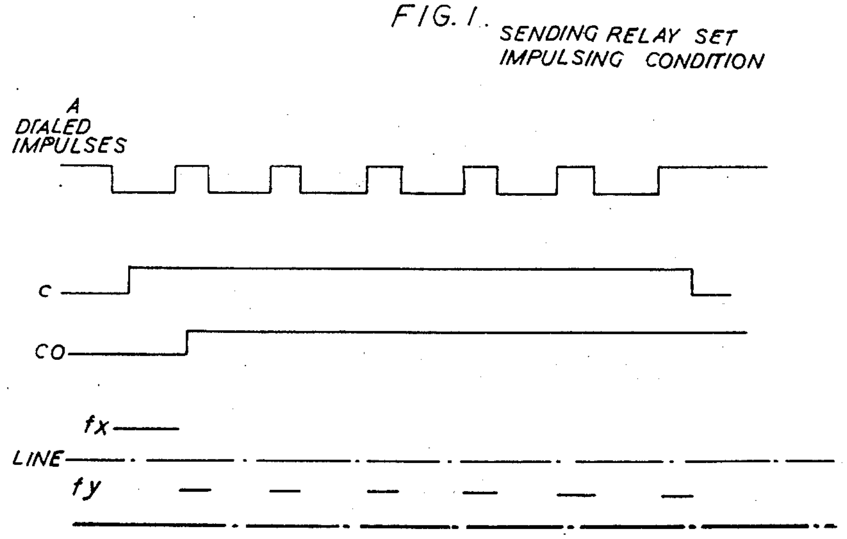
Figure 2:
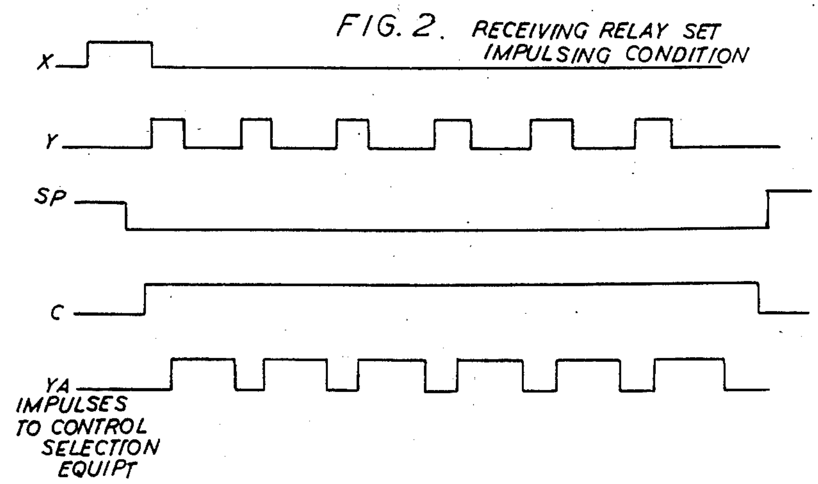
Figure 3:
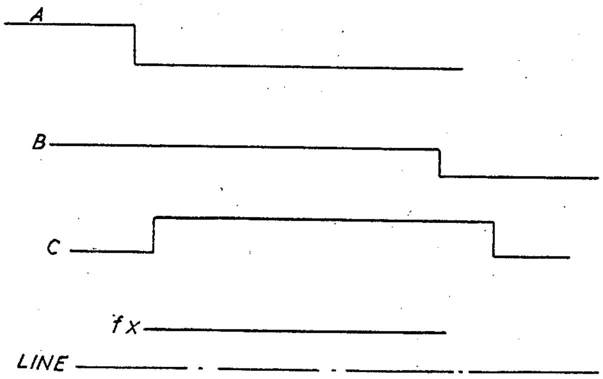
Figs. 3 and 4 show the generation and reception of a release signal.
Figure 4:
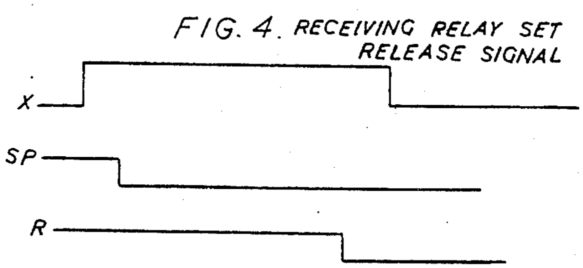
Figures 5, 6:
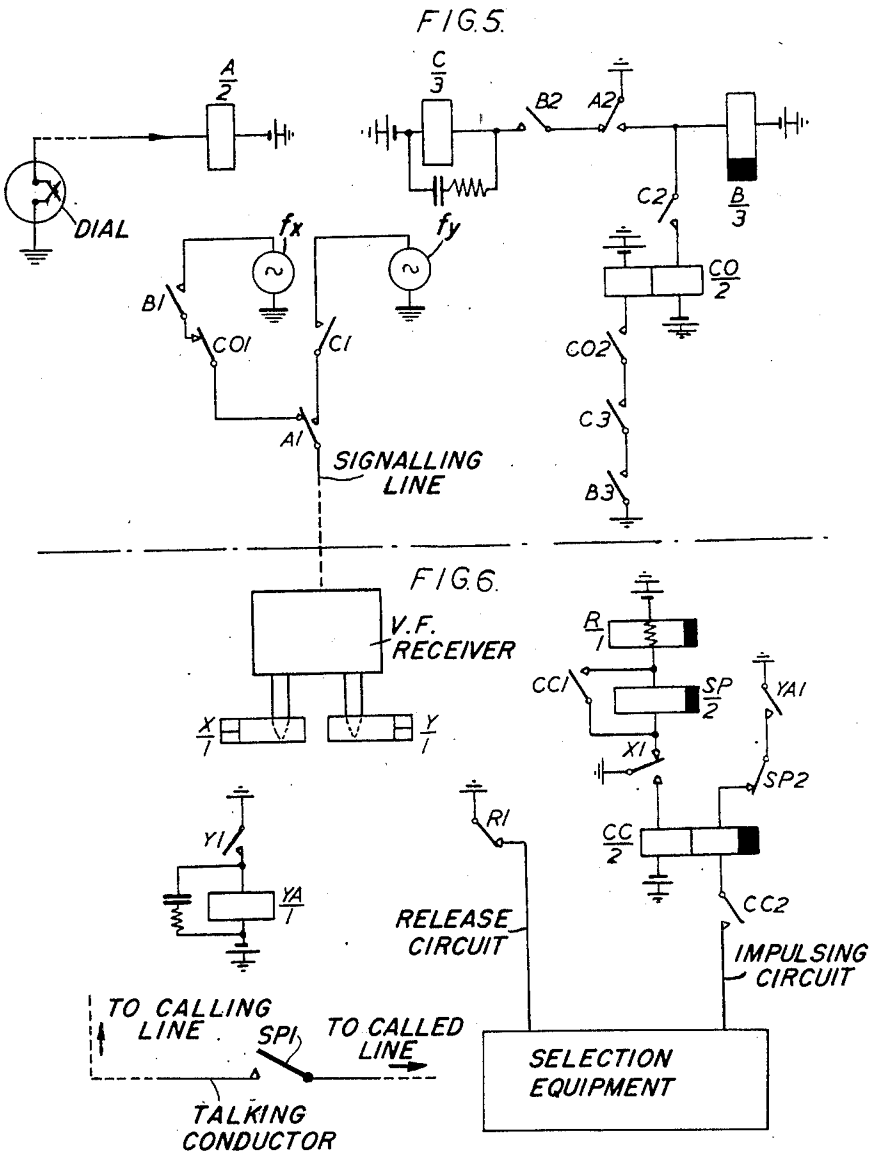
Figs. 5 and 6 show the V. F. transmitting and receiving circuits respectively.

The transmitting circuit of Fig. 5 is actuated in a manner to be described by means of direct current impulses, such as dialing impulses, received over an incoming line thereto from a subscriber's dial or other impulse producing or repeating device and is connected to the receiving circuit Fig. 6 over a signalling channel which may be a long distance carrier circuit or other transmission circuit suitable for voice-frequency transmission. The transmitting circuit Fig. 5 transmits, over the signalling channel, signals comprising voice-frequency current and these signals are received in the receiving circuit Fig. 6 on a voice-frequency receiver of suitable known design which includes devices responsive to the signal frequencies $x$ and $y$. When a signal at frequency $x$ is received, relay X operates while a signal at frequency $y$ operates relay Y. Relays X and Y actuate, in a manner to be described below, well known selection equipment, to extend the signalling channel to another circuit or subscriber's line in well known manner. The transmitting circuit Fig. 5 is seized by the incoming line thereto in any known manner.

Upon seizure of the sending relay set, Fig. 5, relay A operates and relay B follows. Relay A operates over the incoming line over which incoming trains of D.-C. dialled impulses are received. Relay A responds to dialled impulses and upon its first release a circuit is completed for the condenser shunted relay C. This relay also operates so that when relay A re-operates relay CO is now connected.

Reference to the line conditions on the long distance signalling channel, shown interconecting Figs. 5 and 6 will show that when A first released in response to the first break impulse, the $x$ frequency from a suitable voice frequency generator $fx$ was connected to the line via CO1 normal, B1 operated; upon the re-operation of A, $x$ frequency is disconnected and frequency $y$ from the other V. F. generator $fy$ connnected in its place by C1 operated. Subsequent release of A upon the next impulse "break" does not send further signals of frequency $x$ because CO1 has disconnected this frequency. Subsequent "makes" however, continue to send frequency $y$.

The relay C is carefully adjusted so that its release time is a little greater than the maximum "make" impulse, when A has reoperated after the last "break" impulse in the train and remains operated and C releases. Thus frequency $y$ is sent for a period roughly corresponding to a "make" period after impulsing has ceased.

At the receiving end, Fig. 6, the V. F. signals are separated and amplified in the V. F. receiver and cause operation of relay X or Y dependent upon the frequency transmitted, all in well-known mannner. Thus when $x$ frequency, the prefix signal, is received, relay X operates and so disconnects relays SP and R which are normally operated. (Contacts R and SP2 are shown in an unoperated position.) Relay SP is timed to release in approximately 40 milliseconds, say, so that when the 66 ms. "break" period $x$ signal occurs, SP releases; R is however, timed to restore in approximately 200 ms., say, so that R does not release, since X releases and reoperates SP at the cessation of the 66 ms. period. X operated also operates relay CC which short circuits SP via contact CC1 to prevent its reoperation during the digital train. When frequency $y$ is received, i. e. the "make" impulses generated at the sending end, relay Y responds and impulses relay YA. This latter relay is arranged to be 33 ms. slow release so that upon receipt of a pulse of 33 ms. it will remain operated for 66 ms. Thus the contacts of VA1 send 66 ms. "make" impulses to the selection equipment via SP2 normal, CC relay holding winding and the make contact CC2. It will be clear that the contacts SP2 prevent spurious signals of short duration from affecting the selection equipment.

While relay Y continues to receive impulses relay CC is maintained operated, preventing also the re-operation of SP the contacts SP1 of which are arranged to open the line outgoing via wipers of the switch controlled by the digit repeated, via YA1 in order to prevent the transmittal of the impulses over the talking conductors. At the end of a digital train relay Y releases, restores and remains normal so that YA and CC also follow. SP re-operates to restore conditions to normal.

*Clearing condition*

When the sending relay set Fig. 5 receives a clearing condition, relay A, which is normally operated, releases and in consequence disconnects B. While B is maintained operated on account of its slow release slug, contact A1 normal connects frequency $x$ to line. When B releases the frequency source $x$ is disconnected.

At the receiving relay set, Fig. 6, relay X responds to the signal of frequency $x$ and at contact X1 opens the circuit of relays SP and R both of which restore, since the release time of relay B, Fig. 5, and therefore the duration of the signal of frequency $x$, exceeds 200 ms. whilst, as already stated, the relay R has a release time of only 200 ms. Relay R now releases and applies ground via R1 to the selection equipment to initiate the release thereof in any known manner while relay SP opens the outgoing line at contacts SP1 as already explained. At the cessation of the frequency $x$ relay X releases and again closes the circuit of relays SP and R. Relay R re-operates but SP cannot immediately re-operate as relay CC, which was operated when X operated, remains held for its slow release time, maintaining relay SP short circuited. Relay SP, therefore, holds the outgoing line open at SP1, while the selection equipment is restoring to normal.

What is claimed is:

1. A signalling system for directly translating selective trains of direct current signals into corresponding trains of voice-frequency signals comprising, means for generating trains of direct current signals each of a same predetermined "break" duration corresponding to an interruption of line current and having a predetermined "make" duration between signals, means for receiving said trains of direct current signals, voice-frequency transmitting equipment including two different voice-frequency sources, means responsive to the initial reception of a first break signal of a direct current signal train for controlling said transmitting equipment to transmit a prefix signal from a first frequency source, means responsive to the end of each break period of said direct current signal train for controlling said transmitting equipment to transmit a voice-frequency signal from said second frequency source of a duration corresponding to said make period, and time delay means operative to terminate a last voice frequency signal transmitted from said second voice frequency source after the lapse of a time period substantially equal to a make period.

2. The signalling system as claimed in claim 1 and further comprising means for retranslating said transmitted voice-frequency signal trains into direct current signal trains as originally received.

3. The signalling system as claimed in claim 2 wherein said means for retranslating said voice-frequency signals into direct current signals includes, means for receiving said voice-frequency signals and means responsive to reception of each voice-frequency signal of "make" duration for generating a direct current signal of "break" duration.

LESLIE RONALD BROWN.

REFERENCES CITED

The following references are of record in the file of this patent:

UNITED STATES PATENTS

| Number | Name | Date |
|---|---|---|
| 1,746,327 | Von Beckerath | Feb. 11, 1930 |
| 1,831,730 | Ahlberg | Nov. 10, 1931 |
| 2,023,011 | Dunhan | Dec. 3, 1935 |
| 2,061,802 | Kroll | Nov. 24, 1936 |
| 2,358,145 | Christian | Sept. 12, 1944 |
| 2,371,972 | Martins | Mar. 20, 1945 |
| 2,376,352 | Gillings | May 22, 1945 |
| 2,424,452 | Gillings | July 22, 1947 |

FOREIGN PATENTS

| Number | Country | Date |
|---|---|---|
| 559,016 | Great Britain | Feb. 1, 1944 |
| 586,753 | Great Britain | Mar. 31, 1947 |